United States Patent
Zhang et al.

(10) Patent No.: US 10,194,420 B2
(45) Date of Patent: Jan. 29, 2019

(54) COMMUNICATION METHOD AND APPARATUS THEREOF

(71) Applicant: Huawei Technologies Co., Ltd., Shenzhen (CN)

(72) Inventors: Weiliang Zhang, Beijing (CN); Guangwei Yu, Beijing (CN); Zhijun Li, Beijing (CN); Yiling Wu, Beijing (CN); Jianbing Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 14/991,694

(22) Filed: Jan. 8, 2016

(65) Prior Publication Data
US 2016/0157212 A1 Jun. 2, 2016

Related U.S. Application Data

(63) Continuation of application No. PCT/CN2013/079148, filed on Jul. 10, 2013.

(51) Int. Cl.
*H04W 72/04* (2009.01)
*H04W 16/06* (2009.01)
*H04W 16/14* (2009.01)

(52) U.S. Cl.
CPC .......... *H04W 72/04* (2013.01); *H04W 16/06* (2013.01); *H04W 16/14* (2013.01)

(58) Field of Classification Search
CPC ...... H04W 72/04; H04W 16/06; H04W 16/14
USPC ........................................................ 370/329
See application file for complete search history.

(56) References Cited

U.S. PATENT DOCUMENTS

| 5,818,827 A | * | 10/1998 | Usui | H04W 88/06 370/342 |
| 2007/0097943 A1 | | 5/2007 | Lange | |
| 2007/0258417 A1 | * | 11/2007 | Harvey | H04W 16/14 370/338 |
| 2007/0297323 A1 | * | 12/2007 | Seki | H04L 5/023 370/208 |
| 2012/0140760 A1 | | 6/2012 | Schmidt | |
| 2012/0250591 A1 | | 10/2012 | Diao et al. | |
| 2012/0257551 A1 | | 10/2012 | Diao et al. | |

FOREIGN PATENT DOCUMENTS

| CN | 1149810 A | 5/1997 |
| CN | 1089531 C | 8/2002 |
| CN | 1968491 A | 5/2007 |
| CN | 102118756 A | 7/2011 |

(Continued)

*Primary Examiner* — Brandon M Renner
*Assistant Examiner* — The Hy Nguyen
(74) *Attorney, Agent, or Firm* — Leydig, Voit & Mayer, Ltd.

(57) ABSTRACT

Embodiments of the disclosure provide a communication method and an apparatus thereof. The method includes: generating a first signal; and sending the first signal to a receiver over a first channel, where the first channel is one of multiple channels in a first band for narrowband communication, and at least a part of the first band is located in a guard band of a radio access network RAN. In the embodiments of the disclosure, a spectrum resource of a guard band of a RAN is used to establish a spectrum resource applicable to narrowband communication, thus improving spectrum utilization.

6 Claims, 5 Drawing Sheets

(56) References Cited

FOREIGN PATENT DOCUMENTS

| | | |
|---|---|---|
| CN | 102118860 A | 7/2011 |
| CN | 102474300 A | 5/2012 |
| EP | 2384078 A1 | 11/2011 |

* cited by examiner

COMMUNICATION METHOD AND APPARATUS THEREOF

CROSS-REFERENCE TO RELATED APPLICATIONS

This application is a continuation of International Patent Application No. PCT/CN2013/079148, filed on Jul. 10, 2013, which is hereby incorporated by reference in its entirety.

TECHNICAL FIELD

The present application relates to the wireless communications field, and in particular, to a communication method and an apparatus thereof.

BACKGROUND

With development of applications in intelligent meter reading, monitoring, measurement, logistics, and the like, machine to machine (M2M) communication accounts for a larger proportion in information exchange during daily production and life.

M2M communication features a small data transmission amount. If a transmission channel of a prior-art radio access network (RAN) is still used to achieve M2M communication, a waste of spectrum resources is caused.

Therefore, there is an urgent need for an applicable M2M communication mode.

SUMMARY

Embodiments of the disclosure provide a communication method and an apparatus thereof, so as to create a spectrum resource applicable to narrowband communication.

According to a first aspect, a communication method is provided, including: generating a first signal; and sending the first signal to a receiver over a first channel, where the first channel is one of multiple channels in a first band for narrowband communication, and at least a part of the first band is located in a guard band of a RAN.

With reference to the first aspect, in an implementation manner of the first aspect, the first band is located in the guard band of the RAN.

With reference to the first aspect or any one of the foregoing implementation manners of the first aspect, in another implementation manner of the first aspect, a center frequency of the first band is the same as a center frequency of the guard band of the RAN.

With reference to the first aspect or the foregoing implementation manners of the first aspect, in another implementation manner of the first aspect, a guard interval used to prevent mutual signal interference is set between the first band and a transmission band of the RAN.

With reference to the first aspect or any one of the foregoing implementation manners of the first aspect, in another implementation manner of the first aspect, one part of the first band is located in the guard band of the RAN and the other part of the first band occupies the transmission band of the RAN.

With reference to the first aspect or any one of the foregoing implementation manners of the first aspect, in another implementation manner of the first aspect, a center frequency of the first band has a same frequency as an endpoint of the transmission band of the RAN, one half of the first band is located in the guard band of the RAN, and the other half occupies an edge band of the transmission band of the RAN.

With reference to the first aspect or any one of the foregoing implementation manners of the first aspect, in another implementation manner of the first aspect, a guard interval used to prevent mutual signal interference is set between the first band and a remaining transmission band, except the transmission band occupied by the first band, of the RAN.

With reference to the first aspect or the foregoing implementation manners of the first aspect, in another implementation manner of the first aspect, the multiple channels in the first band are spaced at intervals.

According to a second aspect, a communication method is provided, including: receiving, over a first channel, a first signal sent by a transmit end, where the first channel is one of multiple channels in a first band for narrowband communication, and at least a part of the first band is located in a guard band of a radio access network RAN; and processing the first signal.

With reference to the second aspect, in an implementation manner of the second aspect, the first band is located in the guard band of the RAN.

With reference to the second aspect or any one of the foregoing implementation manners of the second aspect, in another implementation manner of the second aspect, a center frequency of the first band is the same as a center frequency of the guard band of the RAN.

With reference to the second aspect or any one of the foregoing implementation manners of the second aspect, in another implementation manner of the second aspect, a guard interval used to prevent mutual signal interference is set between the first band and a transmission band of the RAN.

With reference to the second aspect or any one of the foregoing implementation manners of the second aspect, in another implementation manner of the second aspect, one part of the first band is located in the guard band of the RAN and the other part of the first band occupies a transmission band of the RAN.

With reference to the second aspect or any one of the foregoing implementation manners of the second aspect, in another implementation manner of the second aspect, a center frequency of the first band has a same frequency as an endpoint of the transmission band of the RAN, one half of the first band is located in the guard band of the RAN, and the other half occupies an edge band of the transmission band of the RAN.

With reference to the second aspect or any one of the foregoing implementation manners of the second aspect, in another implementation manner of the second aspect, a guard interval used to prevent mutual signal interference is set between the first band and a remaining transmission band, except the transmission band occupied by the first band, of the RAN.

With reference to the second aspect or any one of the foregoing implementation manners of the second aspect, in another implementation manner of the second aspect, the multiple channels in the first band are spaced at intervals.

According to a third aspect, a communications apparatus is provided, including: a generation unit, configured to generate a first signal; and a sending unit, configured to send, to a receiver over a first channel, the first signal generated by the generation unit, where the first channel is one of multiple channels in a first band for narrowband communication, and at least a part of the first band is located in a guard band of a RAN.

With reference to the third aspect, in an implementation manner of the third aspect, the first band is located in the guard band of the RAN.

With reference to the third aspect or any one of the foregoing implementation manners of the third aspect, in another implementation manner of the third aspect, a center frequency of the first band is the same as a center frequency of the guard band of the RAN.

With reference to the third aspect or any one of the foregoing implementation manners of the third aspect, in another implementation manner of the third aspect, a guard interval used to prevent mutual signal interference is set between the first band and a transmission band of the RAN.

With reference to the third aspect or any one of the foregoing implementation manners of the third aspect, in another implementation manner of the third aspect, one part of the first band is located in the guard band of the RAN and the other part of the first band occupies the transmission band of the RAN.

With reference to the third aspect or any one of the foregoing implementation manners of the third aspect, in another implementation manner of the third aspect, a center frequency of the first band has a same frequency as an endpoint of the transmission band of the RAN, one half of the first band is located in the guard band of the RAN, and the other half occupies an edge band of the transmission band of the RAN.

With reference to the third aspect or any one of the foregoing implementation manners of the third aspect, in another implementation manner of the third aspect, a guard interval used to prevent mutual signal interference is set between the first band and a remaining transmission band, except the transmission band occupied by the first band, of the RAN.

With reference to the third aspect or any one of the foregoing implementation manners of the third aspect, in another implementation manner of the third aspect, the multiple channels in the first band are spaced at intervals.

According to a fourth aspect, a communications apparatus is provided, including: a receiving unit, configured to receive, over a first channel, a first signal sent by a transmit end, where the first channel is one of multiple channels in a first band for narrowband communication, and at least a part of the first band is located in a guard band of a RAN; and a processing unit, configured to process the first signal received by the receiving unit.

With reference to the fourth aspect, in an implementation manner of the fourth aspect, the first band is located in the guard band of the RAN.

With reference to the fourth aspect or any one of the foregoing implementation manners of the fourth aspect, in another implementation manner of the fourth aspect, a center frequency of the first band is the same as a center frequency of the guard band of the RAN.

With reference to the fourth aspect or any one of the foregoing implementation manners of the fourth aspect, in another implementation manner of the fourth aspect, a guard interval used to prevent mutual signal interference is set between the first band and a transmission band of the RAN.

With reference to the fourth aspect or any one of the foregoing implementation manners of the fourth aspect, in another implementation manner of the fourth aspect, one part of the first band is located in the guard band of the RAN and the other part of the first band occupies a transmission band of the RAN.

With reference to the fourth aspect or any one of the foregoing implementation manners of the fourth aspect, in another implementation manner of the fourth aspect, a center frequency of the first band has a same frequency as an endpoint of the transmission band of the RAN, one half of the first band is located in the guard band of the RAN, and the other half occupies an edge band of the transmission band of the RAN.

With reference to the fourth aspect or any one of the foregoing implementation manners of the fourth aspect, in another implementation manner of the fourth aspect, a guard interval used to prevent mutual signal interference is set between the first band and a remaining transmission band, except the transmission band occupied by the first band, of the RAN.

With reference to the fourth aspect or any one of the foregoing implementation manners of the fourth aspect, in another implementation manner of the fourth aspect, the multiple channels in the first band are spaced at intervals.

In the embodiments of the present application, a spectrum resource of a guard band of a RAN is used to establish a spectrum resource applicable to narrowband communication, thus improving spectrum utilization.

BRIEF DESCRIPTION OF DRAWINGS

To describe the technical solutions in the embodiments of the present application more clearly, the following briefly introduces the accompanying drawings required for describing the embodiments of the disclosure. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the disclosure. Apparently, the described embodiments are a part rather than all of the embodiments of the disclosure. All other embodiments obtained by a person of ordinary skill in the art based on the embodiments of the present application without creative efforts shall fall within the protection scope of the present application.

It should be understood that the technical solutions of the present application may be applied to various communications systems, such as: a Global System for Mobile Communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, and a Universal Mobile Telecommunications System (UMTS).

It should further be understood that in the embodiments of the disclosure, user equipment (UE) includes but is not limited to a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" telephone), or a computer having a communication function; the user equipment may further be a portable, pocket-sized, handheld, computer built-in, or in-vehicle mobile apparatus.

In communications systems of different communications standards, a band of a channel of a RAN may include a transmission band and a guard band, where the guard band of the RAN is mainly used to reduce interference of adjacent channels. For example, in an LTE system, a channel bandwidth may be 20 MHz, where an actually used bandwidth of a transmission band is 18 MHz, and guard bands each with a bandwidth of 1 MHz are separately set on both sides of the transmission band.

Figure 1:
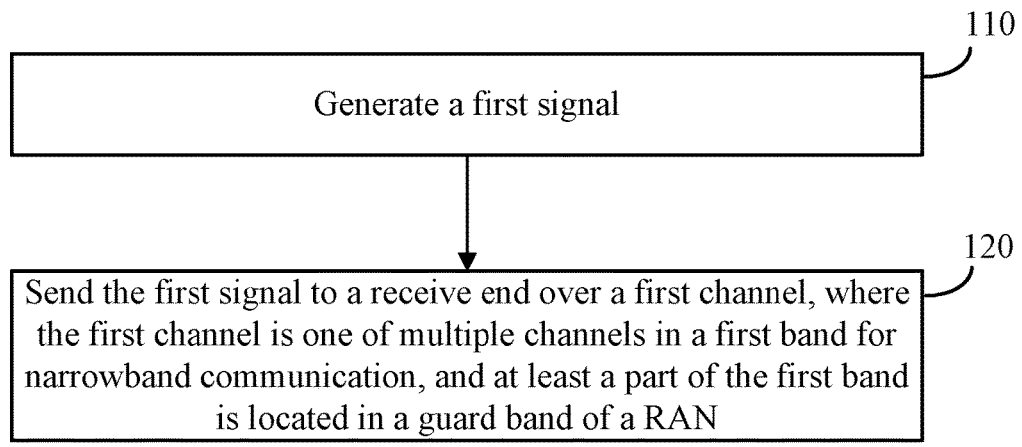
FIG. 1 is a schematic flowchart of a communication method according to an embodiment of the disclosure.

FIG. 1 is a schematic flowchart of a communication method according to an embodiment of the present invention. The method in FIG. 1 is executed by a transmit end. For example, when the FIG. 1 illustrates a downlink service, the transmit end may be a base station; when FIG. 1 illustrates an uplink service, the transmit end may be UE. The UE may be UE specially used for narrowband communication, for example, a UE in a M2M service. The method includes:

110. Generate a first signal.

120. Send the first signal to a receiver over a first channel, where the first channel is one of multiple channels in a first band for narrowband communication, and at least a part of the first band is located in a guard band of a RAN.

In other words, the transmit end may use at least a part of the guard band of the RAN to perform narrowband communication with the receiver. For example, the guard band may be a high-frequency guard band located on one side of the transmission band of the RAN, a low-frequency guard band located on the other side of the transmission band of the RAN, or a combination of high-frequency and low-frequency guard bands.

In this embodiment of the present application, a spectrum resource of a guard band of a RAN is used to establish a spectrum resource applicable to narrowband communication, thus improving spectrum utilization.

It should be understood that a specific form of the first signal in step 110 is not limited in this embodiment of the present application. The first signal may be control signaling, or may be service data, where the service data may be determined according to an actual status of a service. For example, for an intelligent meter reading service in M2M, the first signal may carry data and the like recorded by an intelligent meter.

It should be understood that a specific type of the multiple channels in step 120 is not limited in this embodiment of the present application. When FIG. 1 illustrates a downlink service, the multiple channels are downlink channels. When FIG. 1 illustrates an uplink service, the multiple channels are uplink channels.

In step 120, the first band may be a section of consecutive bands for narrowband communication, for example, an M2M communication service, which is not limited in this embodiment of the present invention. For example, the first band in step 120 may alternatively be multiple sections of inconsecutive bands. In addition, at least a part of the first band is located in the guard band of the RAN. It should be understood that any embodiment in which the first band overlaps with the guard band of the RAN shall fall within the protection scope of this embodiment of the present application. For example, the first band may all be located in the guard band of the RAN; or a part of the first band is in located in the guard band of the RAN, and another part occupies the transmission band of the RAN.

Optionally, in an embodiment, the first band is located in the guard band of the RAN, but distribution of the first band in the guard band of the RAN is not specifically limited in this embodiment of the present invention. For example, when the guard band is 0 MHz-1 MHz, the first band may be 0.1 MHz-0.7 MHz.

Optionally, in another embodiment, a center frequency of the first band is the same as a center frequency of the guard band of the RAN.

For example, in LTE, assuming that a bandwidth of a channel is 20 MHz, a transmission band of the channel is 1 MHz-19 MHz, where 0 MHz-1 MHz is a low-frequency guard band, and 19 MHz-20 MHz is a high-frequency guard band. The first channel may be located in the low-frequency guard band, or may be located in the high-frequency guard band. Specifically, when the method in FIG. 1 is executed by UE, the first channel may be an uplink channel, and the first band may be located in the high-frequency guard band. For example, the first band is 19 MHz-20 MHz, or 19.1 MHz-19.9 MHz, or the like. When the method in FIG. 1 is executed by a base station, the first channel may be a downlink channel, and the first band may be located in the low-frequency guard band. For example, the first band is 0 MHz-1 MHz, or 0.1 MHz-0.9 MHz. It should be understood that the foregoing values are only examples, but are not intended to limit this embodiment of the present application to specific scenarios. In an actual scenario, specific values can be selected according to a service type, a required bandwidth, and other factors of narrowband communication.

Further, a guard interval used to prevent mutual signal interference is set between the first band and the transmission band of the RAN. For example, when the first band is 19.1 MHz-19.9 MHz, a band between 19 MHz and 19.1 MHz is the guard interval between the first band and the transmission band of the RAN. Similarly, 19.9 MHz-20 MHz is the guard interval between the first band and a transmission band of an adjacent channel of the RAN. Setting the guard interval between the first band for narrowband communication and the transmission band of the RAN helps reduce signal interference between narrowband communication and RAN communication. It should be noted that a specific value of the guard interval is not limited in this embodiment of the present invention and can be determined according to a relationship between a size of the interval and signal interference. For example, if a guard interval of 140 KHz between narrowband communication and RAN communication is enough for signal interference between them to be ignored, the guard interval can be set to 140 KHz.

Optionally, in another embodiment, one part of the first band is located in the guard band of the RAN and the other part of the first band occupies the transmission band of the RAN. In this embodiment of the present application, a proportion of the part of the first band in the guard band of the RAN to the part of the first band in the transmission band of the RAN is not specifically limited, and can be determined according to an actual situation, such as a type of a narrowband communication service, a quantity of services, and usage of the transmission band.

Optionally, in another embodiment, a center frequency of the first band has a same frequency as an endpoint of the transmission band of the RAN, one half of the first band is located in the guard band of the RAN, and the other half occupies an edge band of the transmission band of the RAN.

Specifically, the assumption about band distribution of a channel in the LTE is still used. When the method in FIG. 1 is executed by UE, the first channel may be an uplink channel, and the first band may be 18.3 MHz-19.7 MHz, where 19 MHz-19.7 MHz is located in the high-frequency guard band, and 18.3 MHz-19 MHz is located in the transmission band. When the method in FIG. 1 is executed by a base station, the first channel may be a downlink channel, and the first band may be 0.3 MHz-1.7 MHz, where 0.3 MHz-1 MHz is located in the low-frequency guard band, and 1 MHz-1.7 MHz is located in the transmission band.

Further, a guard interval used to prevent mutual signal interference is set between the first band and a remaining transmission band, except the transmission band, occupied by the first band, of the RAN. In other words, the transmission band may be divided into a first part, a second part, and a guard interval located between the first part and the second part, where the first part is allocated to and used by the first band, and the guard interval is used to prevent signal interference between the first band and the second part of the transmission band. For example, the transmission band of the RAN is 1 MHz-19 MHz. When the first band is 18.3 MHz-19.7 MHz, 18.3 MHz-19 MHz is the transmission band occupied by the first band, and a remaining transmission band, except the transmission band occupied by the first band, of the RAN is 1 MHz-18.3 MHz. In this case, a band of 18.1 MHz-18.3 MHz may be set as a guard interval and no signal is transmitted in the guard interval. Therefore, signal interference between narrowband communication and communication in the remaining transmission band of the RAN is reduced.

It should be understood that a quantity of the multiple channels in the first band is not specifically limited in this embodiment of the present application, and can be determined according to whether the first band is applied to uplink transmission or downlink transmission, a quantity of narrowband communication services carried in the first band, and other factors. In addition, optionally, the multiple channels in the first band are spaced at intervals. That is, a guard interval is set between two adjacent channels, and this helps reduce signal interference between the adjacent channels. For example, when the first band is used to carry an uplink service, 64 uplink channels may be set, and a specific guard interval is set between adjacent uplink channels. When the first band is used to carry a downlink service, 16 downlink channels may be set, and a specific guard interval is set between adjacent downlink channels.

With reference to FIG. 1, the foregoing describes a communication method according to an embodiment of the disclosure from a perspective of a transmit end. The following describes, with reference to FIG. 2, a communication method according to an embodiment of the disclosure from a perspective of a receiver.

It should be understood that interaction between the transmit end and the receiver, and related features and functions described on a side of the receiver correspond to descriptions on a side of the transmit end. For brevity, repeated descriptions are appropriately omitted.

Figure 2:
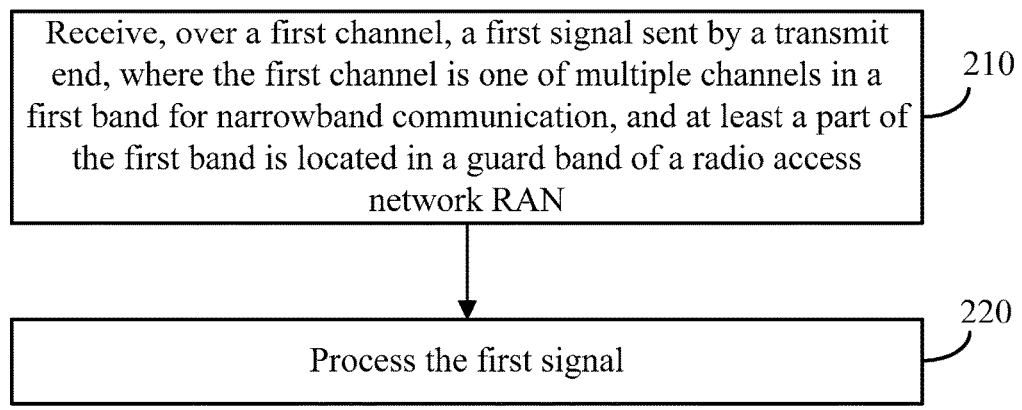
FIG. 2 is a schematic flowchart of a communication method according to another embodiment of the disclosure.

FIG. 2 is a schematic flowchart of a communication method according to another embodiment of the disclosure. The method in FIG. 2 is executed by a receiver. For example, when FIG. 2 illustrates an uplink service, the receiver may be a base station; when FIG. 2 illustrates a downlink service, the receiver may be a UE. The UE may be a UE specially used for narrowband communication, for example, a UE in an M2M service.

210. Receive, over a first channel, a first signal sent by a transmit end, where the first channel is one of multiple channels in a first band for narrowband communication, and at least a part of the first band is located in a guard band of a radio access network RAN.

220. Process the first signal.

In this embodiment of the present application, a spectrum resource of a guard band of a RAN is used to establish a spectrum resource applicable to narrowband communication, thus improving spectrum utilization.

Optionally, in an embodiment, the first band is located in the guard band of the RAN.

Optionally, in another embodiment, a center frequency of the first band is the same as a center frequency of the guard band of the RAN.

Optionally, in another embodiment, a guard interval used to prevent mutual signal interference is set between the first band and a transmission band of the RAN.

Optionally, in another embodiment, one part of the first band is located in the guard band of the RAN and the other part of the first band occupies the transmission band of the RAN.

Optionally, in another embodiment, the center frequency of the first band has a same frequency as an endpoint of the transmission band of the RAN, one half of the first band is located in the guard band of the RAN, and the other half occupies an edge band of the transmission band of the RAN.

Optionally, in another embodiment, a guard interval used to prevent mutual signal interference is set between the first band and a remaining transmission band, except the transmission band occupied by the first band, of the RAN.

Optionally, in another embodiment, the multiple channels in the first band are spaced at intervals.

Figure 3:
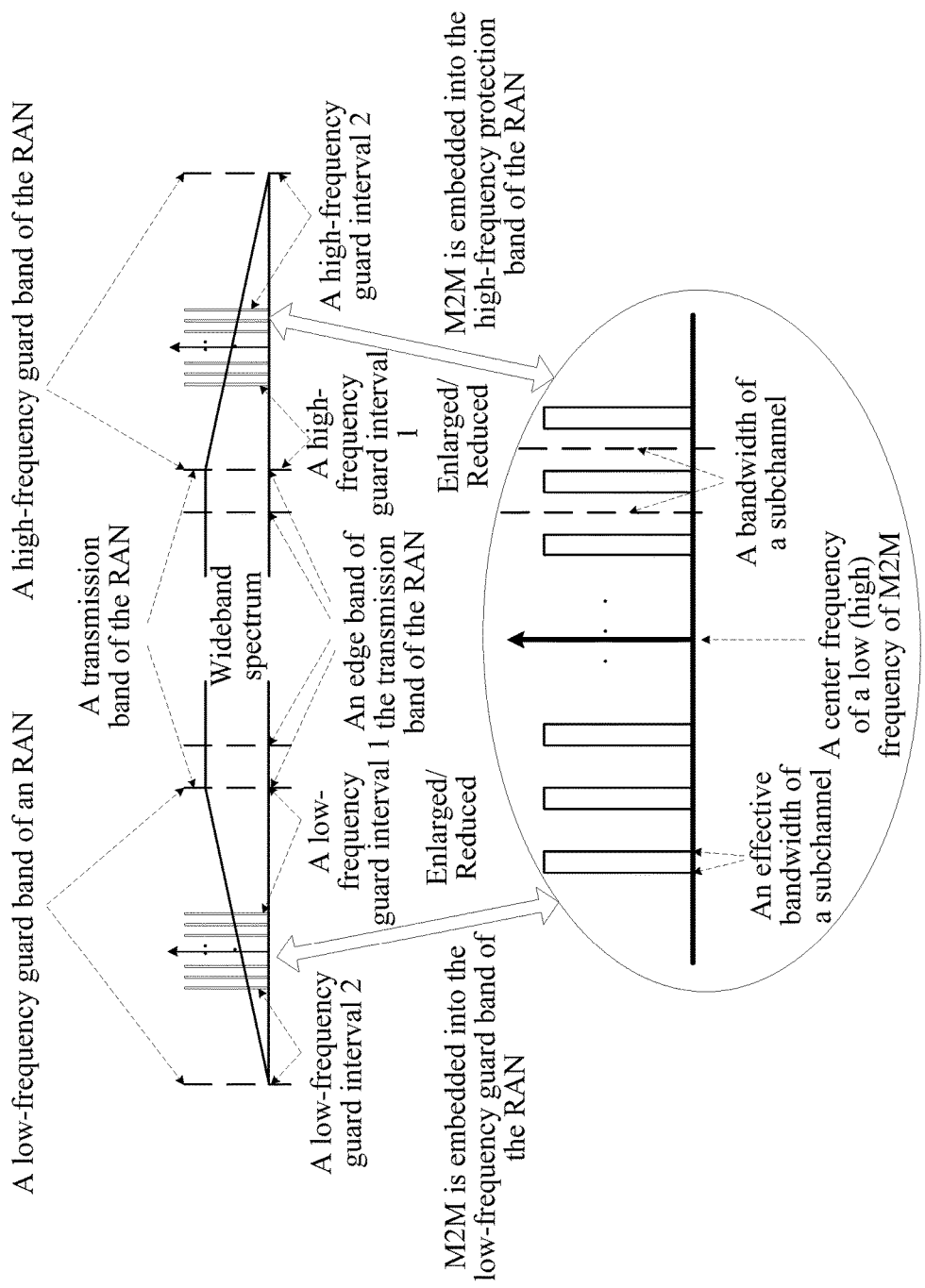
FIG. 3 is a schematic diagram of RAN spectrum planning according to an embodiment of the disclosure.

The following describes this embodiment of the disclosure in more detail with reference to specific examples. It should be noted that the examples in FIG. 3 are merely intended to help a person skilled in the art understand this embodiment of the disclosure, but not for limiting this embodiment of the disclosure to the exemplary specific values or specific scenarios. Apparently, a person skilled in the art can make equivalent modifications or changes according to the given examples in FIG. 3. All these modifications or changes shall fall within the scope of this embodiment of the disclosure.

FIG. 3 is a schematic diagram of RAN spectrum planning according to an embodiment of the disclosure. In FIG. 3, a total bandwidth of 20 MHz of a channel of the RAN includes three parts: a low-frequency guard band (0 MHz-1 MHz) of the RAN, a transmission band (1 MHz-19 MHz) of the RAN, and a high-frequency guard band (19 MHz-20 MHz) of the RAN. One first band described in FIG. 1 to FIG. 2 is set in the low-frequency guard band of the RAN and is set in the high-frequency guard band of the RAN. The two first bands respectively carry an M2M downlink service and an M2M uplink service.

Specifically, in the high-frequency guard band of the RAN, 64 uplink channels are set centering around 19.5 MHz (referring to a center frequency of a band of M2M located in a high frequency guard band of the RAN in FIG. 3). A bandwidth of each uplink channel is 3.75 KHz (referring to an effective bandwidth of a subchannel in FIG. 3), and a guard interval with a bandwidth of 3.75 KHz is set for each side of both sides of each uplink channel. Therefore, one uplink channel actually occupies a bandwidth of 3.75× 3=11.25 KHz (referring to a bandwidth of a subchannel in FIG. 3), a total bandwidth of an uplink band is 11.25 KHz×64=720 KHz, and a guard interval of 140 KHz (referring to a high-frequency guard interval 1 and a high-frequency guard interval 2 in FIG. 3) remains at each end of both ends of the high-frequency guard band of the RAN.

Similarly, in the low-frequency guard band of the RAN, 16 downlink channels are set centering around 0.5 MHz (referring to a center frequency of a band of M2M located in a low-frequency guard band of the RAN in FIG. 3). A bandwidth of each downlink channel is 30 KHz (referring to an effective bandwidth of a subchannel in FIG. 3), and a guard interval with a total bandwidth of 15 KHz is set for both sides of each downlink channel. Therefore, one downlink channel actually occupies a bandwidth of 45 KHz (referring to a bandwidth of a subchannel in FIG. 3), a total bandwidth of a downlink band is 45 KHz×16=720 KHz, and a guard interval of 140 KHz (referring to a low-frequency guard interval 1 and a low-frequency guard interval 2 in FIG. 3) remains at each end of both ends of the guard band.

In conclusion, parameter values in FIG. 3 are as follows:

a bandwidth of the transmission band of the RAN RAN_Band: 18 MHz;

a bandwidth of the low-frequency guard band of the RAN RAN_Guard_Band_L: 1 MHz;

a bandwidth of the high-frequency guard band of the RAN RAN_Guard_Band_H: 1 MHz;

a transmission bandwidth of the uplink channel of M2M Uplink_Sub_Channel_Valid_Bandwidth: 3.75 KHz;

uplink channel spacing of M2M Uplink_Sub_Channel_Bandwidth: 11.25 KHz;

a transmission bandwidth of the downlink channel of M2M Downlink_Sub_Channel_Valid_Bandwidth: 30 KHz; and downlink channel spacing of M2M Downlink_Sub_Channel_Bandwidth: 45 KHz.

When the uplink band of M2M is embedded into the high-frequency guard band of the RAN RAN_Guard_Band_H, related parameters are as follows:

a high-frequency guard interval 1 between M2M and the RAN High_Gap1: 140 KHz;

a high-frequency guard interval 2 between M2M and the RAN High_Gap2: 140 KHz; and the center frequency of the uplink band of M2M M2M_High_Center_F: 19.5 MHz.

When the downlink band of M2M is embedded into the low-frequency guard band of the RAN RAN_Guard_Band_L, related parameters are as follows:

a low-frequency guard interval 1 between M2M and the RAN Low_Gap1: 140 KHz;

a low-frequency guard interval 2 between M2M and the RAN Low_Gap2: 140 KHz; and the center frequency of the downlink band of M2M M2M_Low_Center_F: 0.5 MHz.

It should be noted that the foregoing parameters are only examples, but are not intended to limit this embodiment of the disclosure to a specific value scenario. The foregoing parameters can all be individually configured, and uplink and downlink channel data can also be individually configured according to an actual situation.

With reference to FIG. 1 to FIG. 3, the foregoing describes in detail a communication method according to an embodiment of the present application. The following describes in detail a communications apparatus according to an embodiment of the present application with reference to FIG. 4 to FIG. 7.

Figure 4:
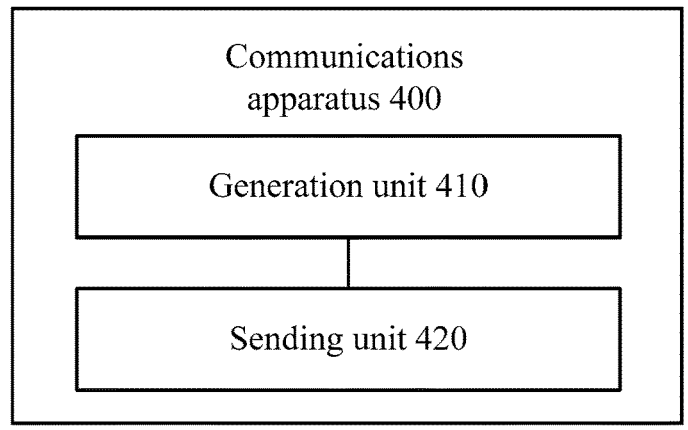
FIG. 4 is a schematic block diagram of a communications apparatus according to an embodiment of the disclosure.

FIG. 4 is a schematic diagram of a structure of a communications apparatus 400 according to an embodiment of the disclosure. The communications apparatus in FIG. 4 can implement the steps performed by the transmit end in FIG. 1 to FIG. 3. To avoid repetition, detailed descriptions are omitted here. In an uplink service, the communications apparatus may be a UE; in a downlink service, the communications apparatus may be a base station. The communications apparatus 400 in FIG. 4 includes a generation unit 410 and a sending unit 420.

The generation unit 410 is configured to generate a first signal.

The sending unit 420 is configured to send, to a receiver over a first channel, the first signal generated by the generation unit 410, where the first channel is one of multiple channels in a first band for narrowband communication, and at least a part of the first band is located in a guard band of a radio access network RAN.

In this embodiment of the disclosure, a spectrum resource of a guard band of a RAN is used to establish a spectrum resource applicable to narrowband communication, thus improving spectrum utilization.

Optionally, in an embodiment, the first band is located in the guard band of the RAN.

Optionally, in another embodiment, a center frequency of the first band is the same as a center frequency of the guard band of the RAN.

Optionally, in another embodiment, a guard interval used to prevent mutual signal interference is set between the first band and a transmission band of the RAN.

Optionally, in another embodiment, one part of the first band is located in the guard band of the RAN and the other part of the first band occupies the transmission band of the RAN.

Optionally, in another embodiment, the center frequency of the first band has a same frequency as an endpoint of the transmission band of the RAN, one half of the first band is located in the guard band of the RAN, and the other half occupies an edge band of the transmission band of the RAN.

Optionally, in another embodiment, a guard interval used to prevent mutual signal interference is set between the first band and a remaining transmission band, except the transmission band occupied by the first band, of the RAN.

Optionally, in another embodiment, the multiple channels in the first band are spaced at intervals.

Figure 5:
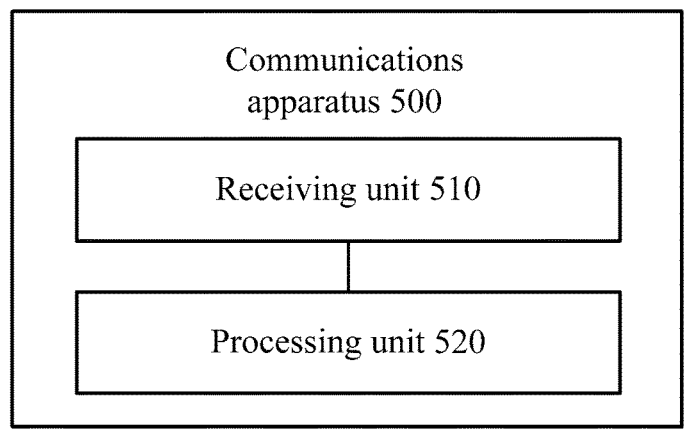
FIG. 5 is a schematic block diagram of a communications apparatus according to another embodiment of the disclosure.

FIG. 5 is a schematic diagram of a structure of a communications apparatus according to another embodiment of the present application. The communications apparatus in FIG. 5 can implement the steps performed by the receiver in FIG. 1 to FIG. 3. To avoid repetition, detailed descriptions are omitted here. In an uplink service, the communications apparatus may be a UE; in a downlink service, the communications apparatus may be a base station. The communications apparatus 500 in FIG. 5 includes a receiving unit 510 and an obtaining unit 520.

The receiving unit 510 is configured to receive, over a first channel, a first signal sent by a transmit end, where the first channel is one of multiple channels in a first band for narrowband communication, and at least a part of the first band is located in a guard band of a radio access network RAN.

The obtaining unit 520 is configured to process the first signal received by the receiving unit 510.

In this embodiment of the present application, a spectrum resource of a guard band of a RAN is used to establish a spectrum resource applicable to narrowband communication, thus improving spectrum utilization.

Optionally, in an embodiment, the first band is located in the guard band of the RAN.

Optionally, in another embodiment, a center frequency of the first band is the same as a center frequency of the guard band of the RAN.

Optionally, in another embodiment, a guard interval used to prevent mutual signal interference is set between the first band and a transmission band of the RAN.

Optionally, in another embodiment, one part of the first band is located in the guard band of the RAN and the other part of the first band occupies the transmission band of the RAN.

Optionally, in another embodiment, the center frequency of the first band has a same frequency as an endpoint of the transmission band of the RAN, one half of the first band is located in the guard band of the RAN, and the other half occupies an edge band of the transmission band of the RAN.

Optionally, in another embodiment, a guard interval used to prevent mutual signal interference is set between the first band and a remaining transmission band, except the transmission band occupied by the first band, of the RAN.

Optionally, in another embodiment, the multiple channels in the first band are spaced at intervals.

Figure 6:
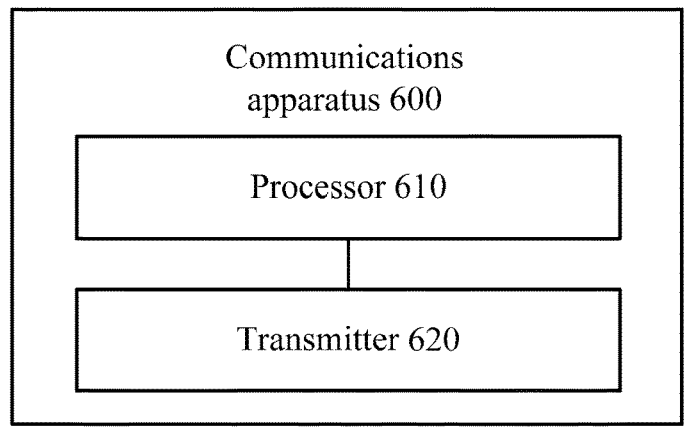
FIG. 6 is a schematic block diagram of a communications apparatus according to another embodiment of the disclosure.

FIG. 6 is a schematic diagram of a structure of a communications apparatus according to another embodiment of the present application. The communications apparatus in FIG. 6 can implement the steps performed by the transmit end in FIG. 1 to FIG. 3. To avoid repetition, detailed descriptions are omitted here. In an uplink service, the communications apparatus may be a UE; in a downlink service, the communications apparatus may be a base station. The communications apparatus 600 in FIG. 6 includes a processor 610 and a transmitter 620.

The processor 610 is configured to generate a first signal.

The transmitter 620 is configured to send, to a receiver over a first channel, the first signal generated by the processor 610, where the first channel is one of multiple channels in a first band for narrowband communication, and at least a part of the first band is located in a guard band of a radio access network RAN.

In this embodiment of the present application, a spectrum resource of a guard band of a RAN is used to establish a spectrum resource applicable to narrowband communication, thus improving spectrum utilization.

Optionally, in an embodiment, the first band is located in the guard band of the RAN.

Optionally, in another embodiment, a center frequency of the first band is the same as a center frequency of the guard band of the RAN.

Optionally, in another embodiment, a guard interval used to prevent mutual signal interference is set between the first band and a transmission band of the RAN.

Optionally, in another embodiment, one part of the first band is located in the guard band of the RAN and the other part of the first band occupies the transmission band of the RAN.

Optionally, in another embodiment, the center frequency of the first band has a same frequency as an endpoint of the transmission band of the RAN, one half of the first band is located in the guard band of the RAN, and the other half occupies an edge band of the transmission band of the RAN.

Optionally, in another embodiment, a guard interval used to prevent mutual signal interference is set between the first band and a remaining transmission band, except the transmission band occupied by the first band, of the RAN.

Optionally, in another embodiment, the multiple channels in the first band are spaced at intervals.

Figure 7:
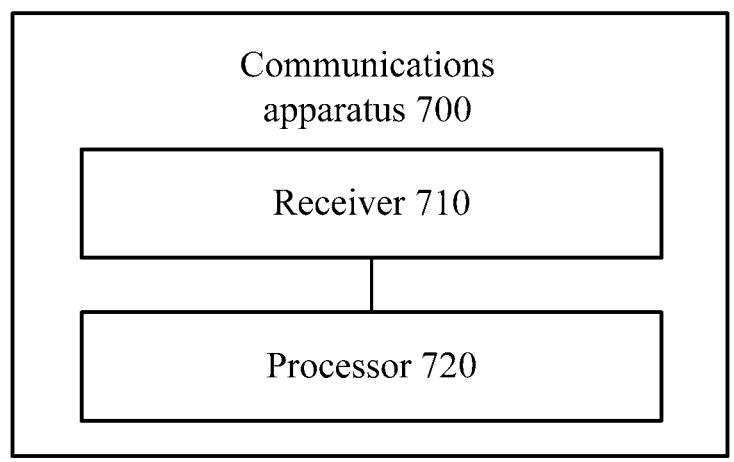
FIG. 7 is a schematic block diagram of a communications apparatus according to another embodiment of the disclosure.

FIG. 7 is a schematic diagram of a structure of a communications apparatus according to another embodiment of the present application. The communications apparatus in FIG. 7 can implement the steps performed by the receiver in FIG. 1 to FIG. 3. To avoid repetition, detailed descriptions are omitted here. In an uplink service, the communications apparatus may be a UE; in a downlink service, the communications apparatus may be a base station. The communications apparatus 700 in FIG. 7 includes a receiver 710 and a processor 720.

The receiver 710 is configured to receive, over a first channel, a first signal sent by a transmit end, where the first channel is one of multiple channels in a first band for narrowband communication, and at least a part of the first band is located in a guard band of a radio access network RAN.

The processor 720 is configured to process the first signal received by the receiver 710.

In this embodiment of the present invention, a spectrum resource of a guard band of a RAN is used to establish a spectrum resource applicable to narrowband communication, thus improving spectrum utilization.

Optionally, in an embodiment, the first band is located in the guard band of the RAN.

Optionally, in another embodiment, a center frequency of the first band is the same as a center frequency of the guard band of the RAN.

Optionally, in another embodiment, a guard interval used to prevent mutual signal interference is set between the first band and a transmission band of the RAN.

Optionally, in another embodiment, one part of the first band is located in the guard band of the RAN and the other part of the first band occupies the transmission band of the RAN.

Optionally, in another embodiment, the center frequency of the first band has a same frequency as an endpoint of the transmission band of the RAN, one half of the first band is located in the guard band of the RAN, and the other half occupies an edge band of the transmission band of the RAN.

Optionally, in another embodiment, a guard interval used to prevent mutual signal interference is set between the first band and a remaining transmission band, except the transmission band occupied by the first band, of the RAN.

Optionally, in another embodiment, the multiple channels in the first band are spaced at intervals.

Figure 8:
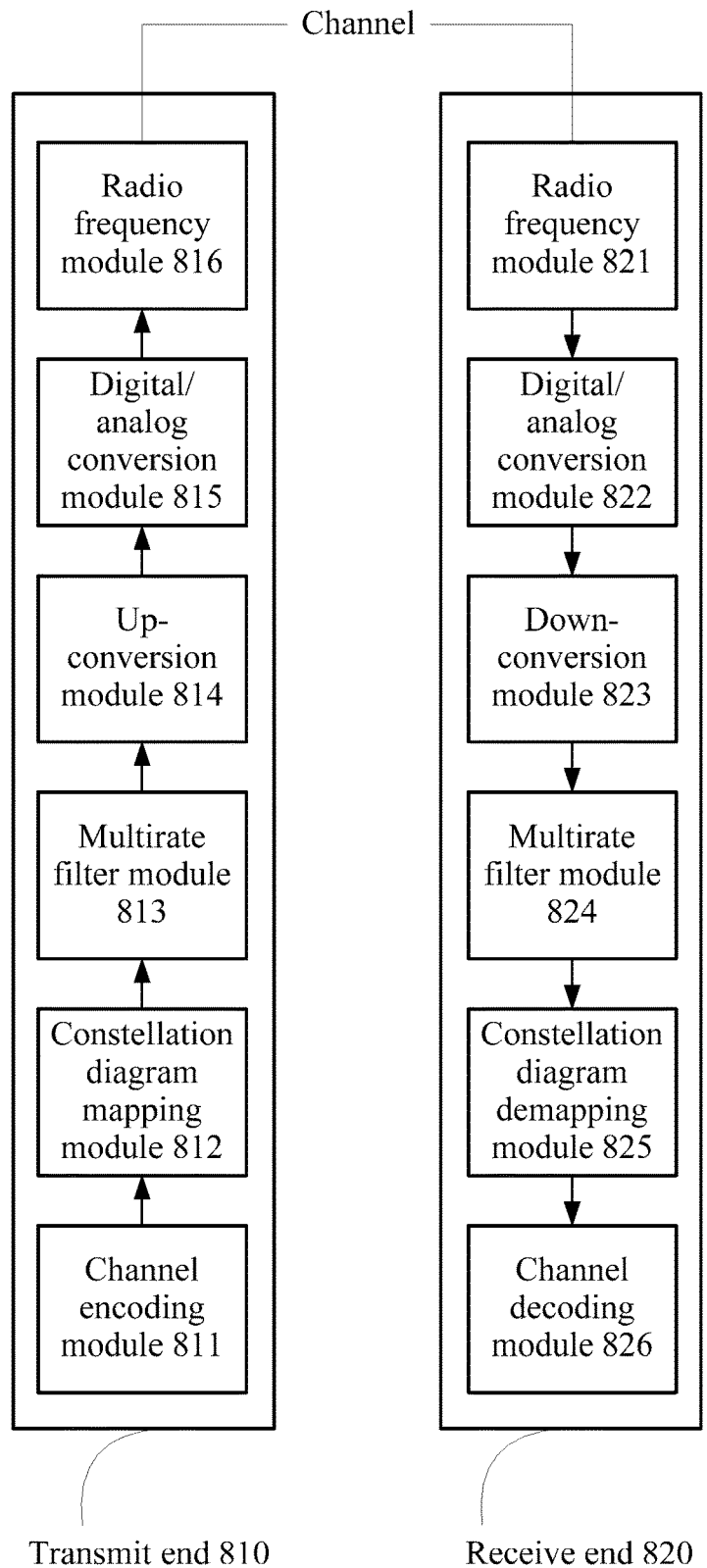
FIG. 8 is a block diagram of a physical layer device according to an embodiment of the disclosure.

FIG. 8 is a diagram of a structure of a physical layer device according to an embodiment of the present application. In FIG. 8, the physical layer device at a transmit end 810 includes: a channel encoding module 811, a constellation diagram mapping module 812, a multirate filter module 813, an up-conversion module 814, a digital/analog conversion module 815, and a radio frequency module 816. The physical layer device at a receiver 820 includes: a radio frequency module 821, a digital/analog conversion module 822, a down-conversion module 823, a multirate filter module 824, a constellation diagram demapping module 825, and a channel decoding module 826.

Specifically, at the transmit end 810, after bits of raw data are processed by the channel encoding module 811 and the constellation diagram mapping module 812 to obtain a to-be-sent data symbol. Then, the multirate filter module 813 increases a sampling rate of the to-be-sent symbol. Next, the up-conversion module modulates a narrowband signal (for example, an M2M signal) to a guard band of a RAN. Finally, the digital/analog conversion module 815 and the radio frequency module 816 perform up conversion, and a base station or UE sends the signal to a channel. During downlink transmission, narrowband communication (such as M2M communication) may share a Remote Radio Unit RRU and an antenna of a base station in the RAN.

At the receiver 820, a radio frequency signal transmitted over the channel is processed by the radio frequency module 821 and the digital/analog conversion module 822 to obtain a baseband received signal. Next, the down-conversion module 823 transfers the narrowband signal from the guard band of the RAN to a location close to a zero frequency. Then, the multirate filter module 824 reduces the sampling rate of the received signal, and filters out outband noise and interference. Finally, the constellation diagram demapping module 825 and the channel decoding module 826 perform constellation diagram demapping and channel decoding processing, to obtain the sent bits of the data.

At the transmit end, digital up-conversion is performed to transfer a narrowband (such as M2M) baseband signal to an adjacent band except a transmission band of the RAN. At the receiver, digital down-conversion is performed to transfer the narrowband signal from the adjacent band except the transmission band of the RAN to a location close to the zero frequency, to obtain the narrowband baseband signal.

On a base station side, a multirate filter is used to adjust a sampling rate of a narrowband signal, so that the narrowband signal can match a baseband signal of a RAN and can share an RRU of the RAN. On a terminal side, a narrowband communications terminal (such as an M2M terminal) needs to process only the narrowband signal, thus reducing power consumption and costs.

The transmit end uses a low-pass filter included in a multirate filter to suppress outband diffusion of a narrowband signal, so that interference by the narrowband signal with a RAN signal can almost be ignored.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present application. Therefore, the protection scope of the present application shall be subject to the protection scope of the claims.

What is claimed is:

1. A communication method comprising:
generating a first signal;
sending the first signal to a receiver over a first channel that is one of multiple channels in a first band for narrowband communication, and at least one part of the first band is located in a guard band of a radio access network (RAN), and another part of the first band occupies a transmission band of the RAN, wherein the transmission band of the RAN comprising a continuous band of frequencies and does not include the guard band of the RAN; and
preventing mutual signal interference by dedicating a contiguous group of frequencies of the transmission band as a guard interval between a remaining contiguous group of frequencies of the transmission band of the RAN and the first band for narrowband communication, wherein the guard interval divides the transmission band of the RAN between the remaining contiguous group of frequencies and another contiguous group of frequencies within the first band for narrowband communication.

2. A communication method comprising:

receiving, over a first channel, a first signal sent by a transmit end, wherein the first channel is one of multiple channels in a first band for narrowband communication, and at least one part of the first band is located in a guard band of a radio access network (RAN) and another part of the first band occupies a transmission band of the RAN, where the transmission band of the RAN comprising a continuous band of frequencies and does not include the guard band of the RAN; and processing the first signal, wherein a guard interval prevents mutual signal interference by dedicating a contiguous group of frequencies of the transmission band as a guard interval between a remaining contiguous group of frequencies of the transmission band of the RAN and the first band for narrowband communication, wherein the guard interval divides the transmission band of the RAN between the remaining contiguous group of frequencies and another contiguous group of frequencies within the first band for narrowband communication.

3. A communications apparatus comprising:

a processor configured to generate a first signal; and a transmitter configured to cooperate with the processor and send to a receiver over a first channel the first signal generated by the processor, wherein the first channel is one of multiple channels in a first band for narrowband communication, and at least one part of the first band is located in a guard band of a radio access network (RAN), and another part of the first band occupies a transmission band of the RAN, wherein the transmission band of the RAN comprising a continuous band of frequencies and does not include the guard band of the RAN, wherein a guard interval prevents mutual signal interference by dedicating a contiguous group of frequencies of the transmission band as a guard interval between a remaining contiguous group of frequencies of the transmission band of the RAN and the first band for narrowband communication, and wherein the guard interval divides the transmission band of the RAN between the remaining contiguous group of frequencies and another contiguous group of frequencies within the first band for narrowband communication.

4. A communications apparatus comprising:

a processor;

a receiver configured to cooperate with the processor to receive, over a first channel, a first signal sent by a transmitter, wherein the first channel is one of multiple channels in a first band for narrowband communication, and at least one part of the first band is located in a guard band of a radio access network (RAN) and another part of the first band occupies a transmission band of the RAN, where the transmission band of the RAN comprising a continuous band of frequencies and does not include the guard band of the RAN; and the processor configured to process the first signal received by the receiver, wherein a guard interval prevents mutual signal interference by dedicating a contiguous group of frequencies of the transmission band as a guard interval between a remaining contiguous group of frequencies of the transmission band of the RAN and by the first band for narrowband communication, wherein the guard interval divides the transmission band of the RAN between the remaining contiguous group of frequencies and another contiguous group of frequencies within the first band for narrowband communication.

5. A non-transitory computer-readable storage medium comprising instructions which, when executed by a computer, cause the computer to carry out the method of claim 1.

6. A non-transitory computer-readable storage medium comprising instructions which, when executed by a computer, cause the computer to carry out the method of claim 2.

* * * * *